Aug. 24, 1943.  C. KAPLAN ET AL  2,327,527
DOWEL AND TENDON ANCHOR DEVICE
Filed March 18, 1941
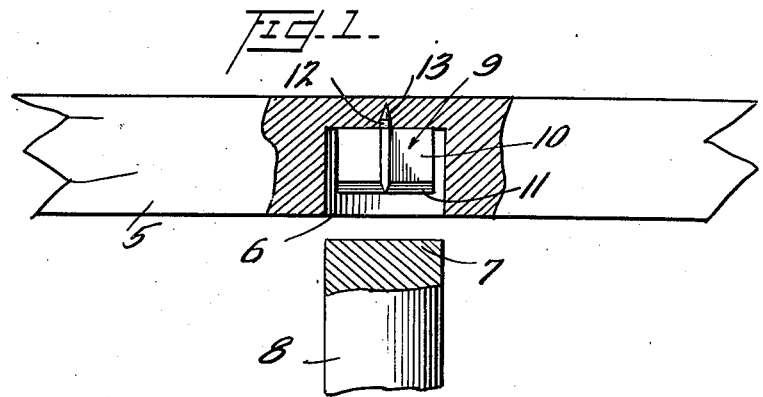
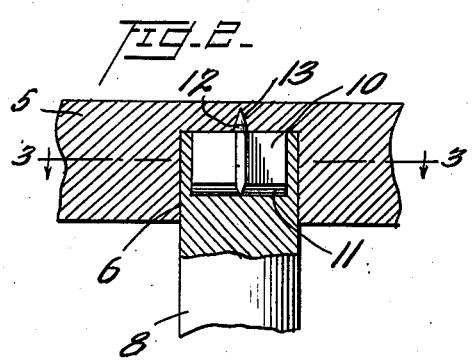
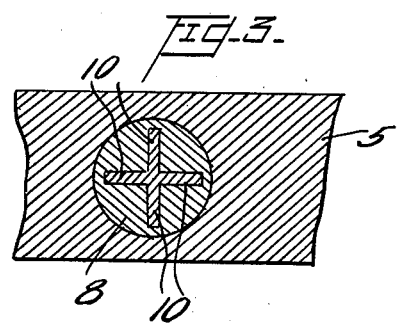
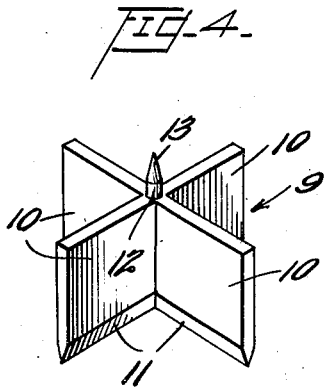
Inventors
Carl Kaplan
Hjalmar Kittilsen
By Shreve, Crow & Gordon
Attorneys.

Patented Aug. 24, 1943

2,327,527

UNITED STATES PATENT OFFICE 2,327,527

DOWEL AND TENDON ANCHOR DEVICE

Carl Kaplan, Brooklyn, and Hjalmar Kittilsen, Springfield Gardens, N. Y.

Application March 18, 1941, Serial No. 384,010

1 Claim. (Cl. 20—92)

Generically this invention relates to joints of the socket and dowel or tendon type but more especially it is directed to means for anchoring such dowel or tendon to prevent separation of the joint.

One of the principal objects of this invention is the provision of a compound or multiple wedge dowel or tendon expanding element, adapted to uniformly expand and compress the end of the tendon against the walls of the mortise opening to form a rigid nonseparable joint.

Another important object of this invention is the provision of a dowel or tendon anchor insertable in a mortise opening and means for retaining the device in operative position in the opening irrespective of the direction of the opening and especially where it faces downward.

Another important object of this invention is the provision of a tendon or dowel anchor device having means for initially securing the device in a mortise opening, thereby not only rendering it possible to utilize it in connection with various sized mortise openings without changing its size but also facilitating positioning the dowel or tendon in said mortise opening.

With these and other objects in view, which will become apparent as the description proceeds, the invention resides in the construction, combination and arrangement of parts, hereinafter more fully described and claimed, and illustrated in the accompanying drawing, in which like characters of reference indicate like parts throughout the several figures, of which:

Fig. 1 is an elevation partly in section of a mortise member and dowel or tendon ready to be assembled with my improved anchor element operatively positioned in the mortise opening.

Fig. 2 is a similar view to Fig. 1 illustrating the parts operatively assembled.

Fig. 3 is a section on the line 3—3 of Fig. 2.

Fig. 4 is a perspective view of the anchor element.

The devices of this general character with which I am familiar have proven more or less deficient and especially with respect to being able to hold the wedge or anchor element in position within the mortise, and also practice has proven it is often difficult for the anchor member to be centralized and project at the proper angle to the tendon or dowel element, especially where the anchor element is not of the exact size of the mortise opening, and it was to overcome such disadvantages and to provide an anchor member capable of being easily secured within the mortise opening and be retained therein in proper centralized position irrespective of the size of the anchor member as compared with that of the mortise and irrespective of the directional position of the mortise opening, and formed with a plurality of equispaced wedge like sections having a centrally located pointed pin-like projection for engagement in the bottom of the mortise for holding the anchor in position to penetrate the end of the dowel or tendon when inserted in the mortise opening to expand the same uniformly throughout its circumference to compressingly engage the wall of the opening and form a rigid joint, that we designed the device forming the subject matter of this invention.

In the illustrated embodiment characterizing this invention there is shown a socket or mortise member 5 in one surface of which is formed a mortise opening 6 adapted to receive the end 7 of a dowel or tendon member 8. In order to firmly secure the end 7 in mortise opening 8 there is provided an anchor or compound wedge member 9, in the present instance, formed with four body sections 10, extending at right angles to each other and in equispaced relation, each of said sections 10 formed at one end with a chisel-like or sharpened edge 11, and said device being formed centrally at its opposite end with an upstanding pin 12 tapering to a sharp point 13.

To operatively position the device 9 it is only necessary to center the device in the mortise opening 6 and force the pin 12 into the member 5, as clearly shown in Fig. 1, and the device will be held in place within said mortise opening irrespective of which surface of member 5 the opening is formed in, whether the under surface or otherwise, and when the dowel 8 is driven or forced into the socket or mortise 6, the sharp edges 11 will penetrate and divide the end 7 into segments, separating said end and compressing said segments against the wall of the opening, thereby firmly locking or securing the dowel or tendon within the mortise to form a rigid joint.

While the device preferably shows four wedge sections, it is obvious that the number and angle with respect to each other may be changed according to the exigencies of the particular requirements as desired.

From the above it is apparent that we have designed a tendon or dowel anchor device simple in construction, manufacturable at a negligible cost, easily installable, and efficient for the purposes intended.

Although in practice we have found that the form of our invention illustrated in the accompanying drawing and referred to in the above description as the preferred embodiment, is the most efficient and practical; yet realizing the conditions concurrent with the adoption of our invention will necessarily vary, we desire to emphasize that various minor changes in details of construction, proportion and arrangement of parts, may be resorted to within the scope of the appended claim without departing from or sacrificing any of the principles of this invention.

Having thus described our invention, what we desire protected by Letters Patent is as set forth in the following claim:

A doweling assembly comprising a doweling member, a socket member formed with a socket to receive said doweling member; a dowel anchoring and wedging device within said socket and seating against its bottom, a plurality of wedge blades arranged in intersecting relation, said blades being formed at one edge and at their point of intersection with an upstanding prong adapted to penetrate the bottom of the socket to center the device within the socket and to secure it centered therein against displacement irrespective of the direction of said socket while the doweling member is being inserted in said socket, said blades being wedge-shaped at their edges remote from said prong to penetrate the dowel member as it is forced to seating position in said socket and to expand and anchor said dowel therein.

CARL KAPLAN.
HJALMAR KITTILSEN.